United States Patent [19]

Willard et al.

[11] Patent Number: 5,625,351
[45] Date of Patent: Apr. 29, 1997

[54] MESSAGING SYSTEM HAVING ROAMING CAPABILITY

[75] Inventors: David F. Willard, Plantation; Barbara D. Laflin, Ocean Ridge; William J. Kuznicki, Coral Springs; Mark Aronson, Boynton Beach; Eric T. Eaton, Lake Worth, all of Fla.

[73] Assignee: Motorola, Inc., Schaumburg, Ill.

[21] Appl. No.: 378,136

[22] Filed: Jan. 24, 1995

[51] Int. Cl.$^6$ ............................................. H04B 7/26
[52] U.S. Cl. ............................ 340/825.52; 340/311.1; 340/825.44; 340/825.47; 379/56; 379/57; 455/33.1; 455/38.1
[58] Field of Search ............................ 455/186.1, 38.2, 455/57.1, 33.1, 33.2, 33.4, 38.1; 340/22, 37, 311.1, 825.44, 825.47, 825.52, 825.68, 825.69; 379/56, 57

[56] References Cited

U.S. PATENT DOCUMENTS

| | | | |
|---|---|---|---|
| 4,644,347 | 2/1987 | Lucas et al. | |
| 4,713,808 | 12/1987 | Gaskill et al. | |
| 4,734,694 | 3/1988 | Umetsu et al. | 340/825.44 |
| 4,914,649 | 4/1990 | Schwendeman et al. | 340/255.44 X |
| 4,977,611 | 12/1990 | Maru | |
| 5,010,330 | 4/1991 | Snowden et al. | 340/825.44 X |
| 5,128,665 | 7/1992 | DeLuca et al. | 340/825.47 |
| 5,136,719 | 8/1992 | Gaskill et al. | |
| 5,168,271 | 12/1992 | Hoff | |
| 5,187,470 | 2/1993 | King et al. | 340/825.44 |
| 5,196,842 | 3/1993 | Gomez et al. | 340/825.44 |
| 5,254,986 | 10/1993 | DeLuca | 340/825.47 X |
| 5,450,071 | 9/1995 | DeLuca et al. | 340/825.44 |
| 5,539,395 | 7/1996 | Buss et al. | 340/825.44 X |

FOREIGN PATENT DOCUMENTS

| | | | |
|---|---|---|---|
| 91/06190 | 5/1991 | WIPO | 340/825.44 |

Primary Examiner—Michael Horabik
Assistant Examiner—William H. Wilson, Jr.
Attorney, Agent, or Firm—D. Andrew Floam

[57] ABSTRACT

A messaging system capable of transmitting messages to receivers which roam between coverage areas. In one configuration, a coverage area (100) is divided into a plurality of zones (110). A single simulcast system identification (SSID) number is assigned which consists of a local identification number which identifies the coverage area (100), a zone identifier which identifies a zone (110) within the coverage area, traffic splitting flags and a frequency. For larger roaming areas, a network (200) is defined as consisting of a plurality of service areas (210) and is identified by network roaming identification information (NRI). NRI information and/or SSID information is stored in a receiver according to desired coverage and like information is transmitted in the corresponding zone or service area.

11 Claims, 10 Drawing Sheets

FIG. 4

1 2 3 4 5 6 7 ... 21 ... 31 32
x0 x1 x2 x3 c0 c1 c2 c3 f0 f1 f2 f3 f4 f5 f6 n0 r0 t0 t1 t2 t3 p p p p p p p p p p p
INFORMATION | PARITY | CK
0 0 1 1 1 1 0 0 0 1 1 1 0 0 0 0 0 0 1

FIG. 5

1 2 3 4 5 6 7 ... 21 ... 31 32
x0 x1 x2 x3 P0 P1 P2 P3 a0 a1 v0 v1 v2 v3 v4 v5 c0 c1 m0 m1 m2 p p p p p p p p p p
INFORMATION | PARITY | CK
0 1 0 1 0 1 0 1 0 0 1 1 1 1 0 0 1 1

FIG. 6

1 2 3 4 5 6 7 ... 21 ... 31 32
x0 x1 x2 x3 f0 f1 f2 s0 s1 s2 s3 s4 s5 s6 s7 s8 s9 s10 s11 s12 s13 p p p p p p p p p p
INFORMATION | PARITY | CK
1 1 0 1 1 0 0 1 0 1 0 0 1 1 1 1 0 0 1 1

| FRAME | A | B | C | D |
|---|---|---|---|---|
| 0 | LID1  T<br>LID2 | T | T | T |
| 1 |  | LID1<br>LID2 |  |  |
| 2 |  |  | LID1<br>LID2 |  |
| 3 |  |  |  | LID1<br>LID2 |
| 4 | LID1 |  |  |  |
| 5 |  | LID1 |  |  |
| 6 |  |  | LID1 |  |
| 7 |  |  |  | LID1 |
| 8 | LID1 |  |  |  |
| 9 |  | LID1 |  |  |
| 10 |  |  | LID1 |  |
| 11 |  |  |  | LID1 |
| 12 | LID1 |  |  |  |
| 13 |  | LID1 |  |  |
| 14 |  |  | LID1 |  |
| 15 |  |  |  | LID1 |
| 16 | LID1 |  |  |  |
| 17 |  | LID1 |  |  |
| 18 |  |  | LID1 |  |
| 19 |  |  |  | LID1 |
| 20 | LID1 |  |  |  |
| ⋮ |  |  |  |  |
| 127 |  |  |  | LID1 |

*FIG. 11*

| FRAME | A | B | C | D |
|---|---|---|---|---|
| 0 | LID1<br>LID2  N1 | T       T | T | T |
| 1 |  | LID1<br>LID2 |  |  |
| 2 |  |  | LID1<br>LID2 |  |
| 3 |  |  |  | LID1<br>LID2  N4 |
| 4 | LID1<br>    N5 |  |  |  |
| 5 |  | LID1<br>N7  N6 |  |  |
| 6 |  |  | LID1 |  |
| 7 |  |  |  | LID1<br>    N8 |
| 8 | LID1<br>    N9 |  |  |  |
| 9 |  | LID1<br>    N10 |  |  |
| 10 |  |  | LID1 |  |
| 11 |  |  |  | LID1 |
| 12 | LID1 |  |  |  |
| 13 |  | LID1<br>    N2 |  |  |
| 14 |  |  | LID1 |  |
| 15 |  |  |  | LID1<br>    N3 |
| 16 | LID1 |  |  |  |
| 17 |  | LID1 |  |  |
| 18 |  |  | LID1 |  |
| 19 |  |  |  | LID1 |
| • | LID1 |  |  |  |
| • |  |  |  |  |
| • |  |  |  |  |
| • |  |  |  |  |
| 127 |  |  |  | LID1 |

*FIG. 13*

| FRAME | A | B | C | D | |
|---|---|---|---|---|---|
| 0 | LID1 LID2 (N1) | T  T2 | T1  T2 | T1  T2 | T1 |
| 1 | | LID1 LID2 (N2) | | | |
| 2 | | | LID1 LID2 (N3) | | |
| 3 | | | | LID1 LID2 (N4) | |
| 4 | LID1 (N5) | | | | |
| 5 | | LID1 (N6) | | | |
| 6 | | | LID1 (N7) | | |
| 7 | | | | LID1 (N8) | |
| 8 | LID1 (N9) | | | | |
| 9 | | LID1 (N10) | | | |
| 10 | | | LID1 (N1) | | |
| 11 | | | | LID1 (N2) | |
| 12 | LID1 (N3) | | | | |
| 13 | | LID1 (N4) | | | |
| 14 | | | LID1 (N5) | | |
| 15 | | | | LID1 (N6) | |
| 16 | LID1 (N7) | | | | |
| 17 | | LID1 (N8) | | | |
| 18 | | | LID1 (N9) | | |
| 19 | | | | LID1 (N10) | |
| ⋮ 127 | LID1  N1 | | | LID1 | |

MESSAGING SYSTEM HAVING ROAMING CAPABILITY

FIELD OF THE INVENTION

The present invention relates to messaging systems, and more particularly to a messaging system having the capability for a receiver to roam and receive messages across a multitude of coverage areas.

BACKGROUND OF THE INVENTION

In today's mobile society, it is desirable to be reachable, such as, by a selective call receiver (pager), everywhere one travels, both locally close to home, as well as in more distant locations in the same country or across the world.

What is needed is a messaging method and system that is capable of accommodating roaming portable communication receivers, such as pagers, between coverage areas of the same service provider and across coverage areas of different service providers is extremely useful.

SUMMARY OF THE INVENTION

It is an object of the present invention to provide a signaling protocol suitable for message transmission to a plurality of addressable receivers which is capable of accommodating message transmission to receivers which roam between service coverage areas.

It is a further object of the present invention to provide a signaling protocol suitable for message transmission to a plurality of addressable receivers which is capable of accommodating roaming receivers and maintaining battery saving performance in the receivers.

It is another object of the present invention to provide a signaling protocol suitable for message transmission to a plurality of addressable receivers which is capable of accommodating roaming receivers have frequency scanning capability.

It is a further object of the present invention to provide a signaling protocol suitable for message transmission to a plurality of addressable receivers which is capable of accommodating roaming receivers, and in which channel selection and roaming information comparisons made in the receiver are simplified.

It is still a further object of the present invention to provide a signaling protocol suitable for message transmission to a plurality of addressable receivers which is capable of accommodating roaming receivers and to provide a receiver with a confirmation of its roaming status.

It is yet another object of the present invention to accommodate multiple protocols on the same channel as well as roaming operation on a radio frequency channel shared by two or more service providers.

It is even a further object of the present invention to provide an efficient process to combine and redirect roaming traffic in a messaging system.

Still another object is to support receivers which are responsive to a multiplicity of data transmission rates provided in a signaling protocol having time division multiplexed phases in a messaging system having roaming capability.

The above and other objects and advantages will become more readily apparent when reference is made to the following description, taken in conjunction with the accompanying drawings.

BRIEF DESCRIPTION OF THE DRAWINGS

FIG. 4 illustrates a structure of a frame information word according to the present invention.

FIGS. 5 and 6 illustrate structures of block information words in which single simulcast identification (SSID) information is coded.

FIG. 11 is frame diagram illustrating the placement of the SSID and time information in accordance with the present invention.

FIG. 12 is a frame diagram illustrating a first placement configuration of the NRI information in accordance with the present invention.

FIG. 13 is a frame diagram illustrating a second placement configuration of the NRI information in accordance with the present invention.

DETAILED DESCRIPTION OF THE DRAWINGS

The present invention is directed to a selective call communication system capable of servicing or transmitting messages to receivers roaming between coverage areas. An example of a selective call signaling system to which the present invention relates is disclosed in commonly assigned U.S. Pat. No. 5,128,665. The entire text and drawings of U.S. Pat. No. 5,128,665 are herein incorporated by reference. The present invention, however, is not in any way limited to a particular type of signaling protocol, and has utility in many types of communication systems, a paging or messaging system being only an example.

Figure 1:
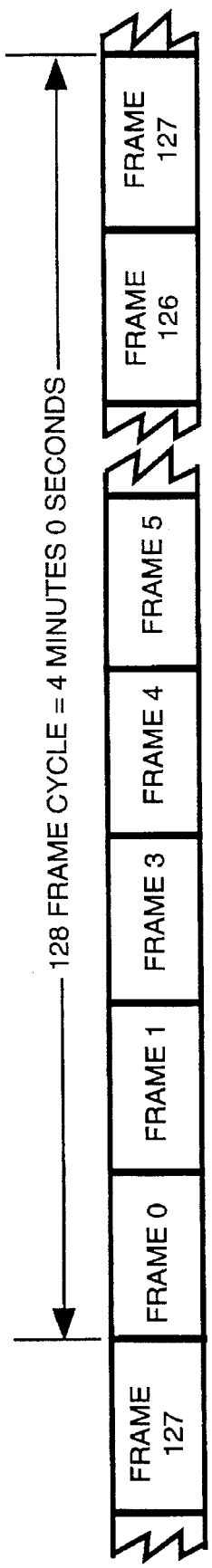
FIGS. 1–3 are timing diagrams illustrating a signaling protocol in accordance with the present invention.
Figure 2:
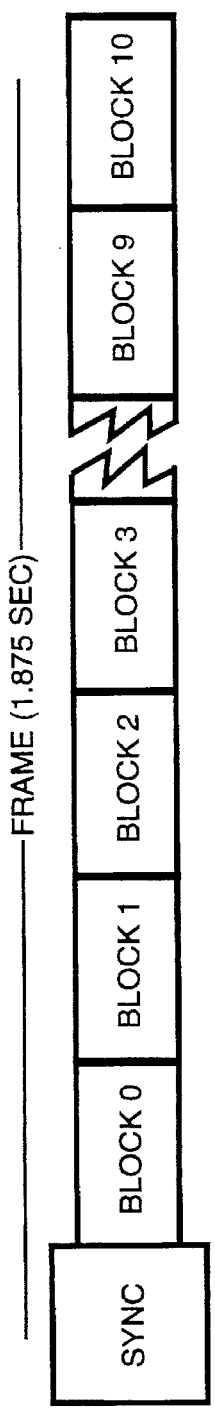
Figure 3:
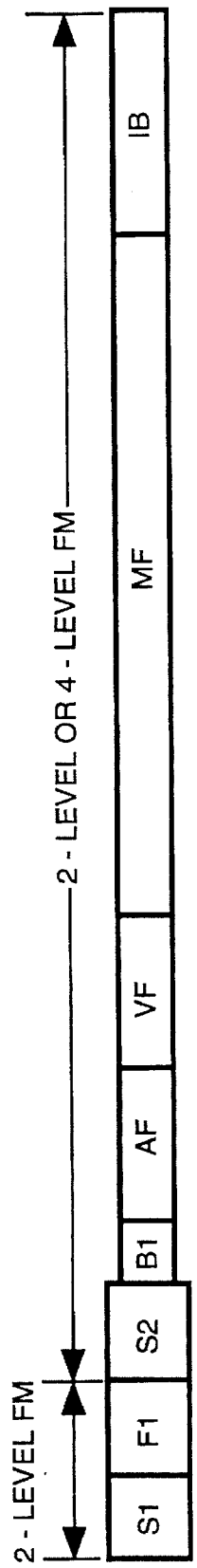

Referring to FIGS. 1–3, an example of a selective call communication system to which the present invention pertains is shown. The signaling system shown comprises 128 frames, with each frame numbered 0 to 127. The frames are transmitted at 32 frames per minute, and thus a full 128 frame cycle lasts 4 minutes. One hour is divided into 15 cycles numbered 0 through 14. It is a synchronous time slot protocol tied to a universal time reference. Frame 0 is synchronized to the start of each hour so that the receiver can derive real time from the current frame and cycle number, thus providing the receiver accurate time within the hour with no need for adjustment.

Moreover, the protocol supports multiple time division multiplexed "phases", wherein for example, a 6400 bits per second (bps) data stream is time division multiplexed into four data streams of 1600 bps. Such a signaling structure is disclosed in commonly assigned U.S. Pat. No. 5,168,493, the entire text and drawings of which is herein incorporated by reference. Thus, the general frame structure shown in FIG. 1 for the single phase shown in FIG. 1 is the same throughout each of four phases.

Each frame comprises a sync portion and several blocks. The sync portion further comprises a Sync 1 portion (S1), a frame information (FI) word and a Sync 2 portion (S2).

Each receiver is assigned a base frame in the set of 128 frames appearing on an radio frequency (RF) channel. A receiver can trade battery life for the more frequent delivery of messages by being assigned to monitor more than one frame per cycle. Once a receiver acquires synchronization to the RF channel, it expects to find its assigned frame within a very tight time window. The use of 4-level FM doubles the data transmission rate per symbol (as compared to 2-level FM) which helps to reduce the effect of simulcast distribution errors and the effect of propagation timing differences between multiple signals within the capture range of the receiver.

As shown in FIG. 3, the Sync 1 (S1) portion of each frame provides for frame timing, symbol timing and indicates the speed of the remainder of the frame. The frame information (FI) word carries 11 bits for the frame and cycle numbers, 5 bits for indication of the time division multiplexed phase of low traffic, 1 bit called a Network Roaming Channel Bit to indicate the presence of a frequency supporting Network-wide roaming service, and other information. The Network Roaming Channel Bit is used to trigger recognition of certain network roaming information which will be described in conjunction with FIG. 4.

The Sync 2 (S2) portion provides for synchronization at the frame's block speed to allow for proper de-multiplexing and decoding of the blocks.

The Block Information (BI) field is the first 1–4 words, called block information worlds, of the first interleaved block and contains frame and system structure information, some of which is pertinent to the present invention and is explained in greater detail hereinafter.

The address field (AF) starts directly after the block information words and consists of short addresses and long addresses. The vector field (VF) maintains a 1 to 1 relationship with the address field. The vector word points to the start word of the associated message. The message field (MF) contains the message words specified by the vector field. IB represents idle blocks which are unused and are filled with appropriate bit patterns.

FIG. 4 illustrates the structure of the frame information word in greater detail. The various parameters in the frame information word are defined as follows:

C Cycle Number (0–14) c3c2c1c0 15/hour f Frame Number (0–127), f6f5f4f3f2f1f0 128/cycle n Network Roaming Channel Bit n=1 indicates network support for roaming and n=0 indicates no network support for roaming r Repeat Paging Indicator If r=1, t3t2t1t0 are reserved to indicate a repeat format exists If r=0, tt3t2t1t0 are Low Traffic flags for each phase in a frame t Definition dependent on value of "r"

At 3200 bits/see t3=t2 and t1=t0 representing two phases in the frame

At 1600 bits/sec t3=t2=t1=t0 representing one phase in the frame t=1 Indicates address field contained in block 0 t=0 Indicates address field extends past block 0

These flags give early indication that the traffic is light and all addresses are contained within block 0.

x Standard 4 bit Check Character

FIG. 5 illustrates an example of block information word 1. Block information word 1 has 2 "a" bits, a0a1, which indicate the start of the address field, 6 "v" bits v5v4v3v2v1v0 which define the start of the vector field, 2 "c" bits c1c0 which indicate traffic overflow into the next frame(s), 3 "m" bits m0m1m2 which indicate the number of high order frame number bits to be masked and 4 "P" bits P3P2P1P0, which indicate the number of priority addresses at the beginning of the address field.

FIG. 6 illustrates an example of block information words 2, 3 and 4. Word Format Type is represented by format bits f2f1f0, s represents the data and x again is the standard 4 bit Check Character.

Below is a table which illustrates the bit pattern definitions for the f and s bits shown in FIG. 6. Depending on the values of bits f2f1f0, the data bits s13–s0 have a particular meaning or application. When f2f1f0 is set to (000), bits s13–s0 represent a 9 bit local identification (LID) number (i8–i0) which identifies 512 possible LID's, and a 5 bit Zone number C4C3C2C1C0, which represents 32 possible coverage Zones associated with a particular LID.

| $f_2$ | $f_1$ | $f_0$ | $s_{13}s_{12}s_{11}s_{10}s_9s_8s_7s_6s_5s_4s_3s_2s_1s_0$ | |
|---|---|---|---|---|
| 0 | 0 | 0 | $i_8i_7i_6i_5i_4i_3i_2i_1i_0C_4C_3C_2C_1C_0$ | 512 Local IDs, 32 Coverage Zones |
| 0 | 0 | 1 | $m_3m_2m_1m_0d_4d_3d_2d_1d_0Y_4Y_3Y_2Y_1Y_0$ | Month, Day, Year |
| 0 | 1 | 0 | $S_2S_1S_0M_5M_4M_3M_2M_1M_0H_4H_3H_2H_1H_0$ | Sec., Min., Hr. |
| 0 | 1 | 1 | Reserved for Future Use | |
| 1 | 0 | 0 | Reserved for Future Use | |
| 1 | 0 | 1 | $Z_9Z_8Z_7Z_6Z_5Z_4Z_3Z_2Z_1Z_0A_3A_2A_1A_0$ | Data, System Message |
| 1 | 1 | 0 | Reserved for Future Use | |
| 1 | 1 | 1 | $C_9C_8C_7C_6C_5C_4C_3C_2C_1C_0T_3T_2T_1T_0$ | Country Code, Traffic Splitting Flags |

Figure 7:
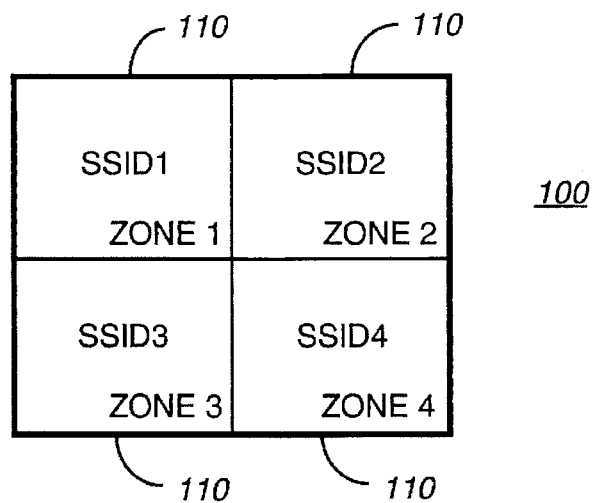
FIG. 7 illustrates a coverage area and zone divisions in accordance with the present invention.

When f2f1f0 is set to (001) and (010), the data bit pattern s13–s0 represents month, day, year, second minute and hour information as shown in FIG. 7. The f2f1f0 bit pattern (101) designates spare data bits s13–s9, a system message A3–A0 and time zone information Z3–Z0.

Finally, of importance is the f2f1f0 bit pattern (111), which indicates a 10 bit Country Code c9–c0 and 4 bits called Traffic Splitting Flags, both of which will be described in more detail hereinafter.

The Country Codes follow, for example, the CCITT Standard which is well known in the art. The 10-bit Country Code is provided to permit reuse of LID's in different countries, following the CCITT standard assignment rules. Country Code information is useful by the nonsubscribing receiver to facilitate a more efficient scan search by first identifying in what country the receiver is located.

With reference to FIG. 7, the smallest division of a coverage area 100 is defined by a simulcast system identification (SSID). An SSID consists of and is uniquely identified by several identifiers: an LID, Zone, Country Code, Traffic Splitting Flags (TSF's) and Frequency. Each Zone 110 has a unique SSID. Thus, if a user desires to receive messages in more than one Zone, the receiver carried by that user would store each of the corresponding SSID's. The Zones shown in FIG. 7 need not be geographically adjacent one another.

In the example shown in FIG. 7, there are 512 possible LID's, each with 32 possible Zones. A "Zone" is a single simulcast area which may be associated with other simulcast areas in a coverage area through a common LID. For example, a service provider is given LID 123456789XXXXX. The service provider has the option to assign this LID to 32 different divisions of a coverage area or Zone. The northern part of a service provider's coverage area may be Zone 1 and would transmit 12345678900001, whereas a southern part is Zone 2 and transmits 12345678900010.

The Traffic Splitting Flags indicate the assignment of 4 groups of roaming traffic to a frequency (channel). Each roaming receiver which finds a frequency to carry a valid LID responds to only one of the 4 Traffic Splitting Flags. When a receiver's assigned flag is equal to 0, the receiver searches for another frequency with the same LID and the assigned flag set equal to 1.

The SSID information is coded into two words:

1st Word (000)
   9 bits=512 LID's
   5 bits=32 Zones
2nd Word (111)
   10 bits=1024 Country Codes
   4 bits=Traffic Splitting Flags The 1st Word, called LID1 hereinafter, corresponds to the first Block information word (000) referred to in FIG. 3, and the 2nd Word, called LID2, corresponds to Block information word (111).

Time and calendar information (block information words f2f1f0=001, 010 and 101) when transmitted, are defined to occur in frame 0, or otherwise in the first valid frame following frame 0. In a roaming capable system, the LID together with the Zone, Country Code and Traffic Splitting Flags occupy the second and third block information words in frame 0. The fourth block information word carries the three available time and calendar information words and are sent in the fourth block information word position in frame 0 in a rotating sequence one block information word at a time over 3 consecutive cycles. This allows the block information words in 001, 010 and 101 to be updated 5 times each hour.

An advantage of this scheme is that these messages are delivered without addresses. System information is used to attach a vector and message to it.

Bits A3–A0 define the type of message and a class of receiver for which it is intended, as shown in the table below. As an example, all receivers should look at this message, receivers which are using SSID frequency information should only look at this message, and/or only receivers which are using network roaming information (NRI) (to be described hereinafter) to lock to this channel should look at this message. Also instructions on which frequency to go to when a Traffic Splitting Flag is changed, and time zone information can be sent.

| A3 | A2 | A1 | A0 | |
|----|----|----|----|---|
| 0 | 0 | 0 | 0 | All message |
| 0 | 0 | 0 | 1 | Local message |
| 0 | 0 | 1 | 0 | Roam message |
| 0 | 0 | 1 | 1 | Roam Instruction |
| 0 | 1 | 0 | 0 | Time Zone |
| **** | | | | |
| 1 | 1 | 1 | 1 | Reserved for future use |

When a system message is indicated, an additional vector is added to the end of the vector field. A receiver decodes block information 4 and determines instruction type and which receivers should look at the message associated with this block information word. After the receiver has determined that it should look at the message it processes the address field and vector field as normal but there will be an additional vector at the end of the vector field. Only the receivers which are instructed to look for a message will look at this vector because all the address/vector combinations will point at message words that are located after this vector which is actually in the location of the first message word for the message field. Up to this point, a certain group of receivers have been informed that there is a message, what type of message to expect, and where to look for this message. Once the receiver enters the message field it decodes the message and handles it according to the message type.

An example of a system message is a greeting message transmitted to a receiver which is roaming into a coverage area outside of its home coverage area.

Another example of the utility of a system message is in connection with the Traffic Splitting Flags. When a service provider has two systems which have the same coverage area (i.e., redundant systems) or overlapping portions of coverage areas, and would like to move traffic from one of the systems to another, the following process is performed.

A system message as described above is sent out informing the receiver of there is going to be a traffic change and the traffic change information is a new frequency XXXXXX. The receiver adds this new frequency to its scan list. The receiver should move to XXXXXX frequency and look for an assigned SSID or NRI on this other frequency. In a later transmission, which could be one month later or it could be 1 minute later, the Traffic Splitting Flag is unset on one frequency and set on the other redundant coverage area system. The receiver detects that roaming traffic is no longer supported on this channel and moves to the frequency it was instructed to go to by the message. Once there, the receiver determines if the SSID or NRI and Traffic Splitting Flag is set correctly. When the SSID or NRI information stored in the receiver match the corresponding transmitted information, the receiver stays on the frequency (and adds this frequency to its scan list). When a match is not made, the receiver will go back to the frequency it was originally on to make sure that it was not a mistake. When that frequency no longer supports the receiver's roaming traffic, the receiver will start looking on its own (scanning the band) for an SSID or NRI match.

Another way to handle traffic splitting is for the system to unset the Traffic Splitting Flag and let the receiver find a new system transmitting that receiver's SSID or NRI.

It should be understood from the foregoing that the same LID and Zone values may be used by the same provider or other providers on other channels.

Stored in each receiver is a list called a scan list, which contains at least one SSID. In each Zone, an SSID is transmitted in a predetermined number of frames, as will be explained hereinafter in conjunction with FIG. 13.

Figure 8:
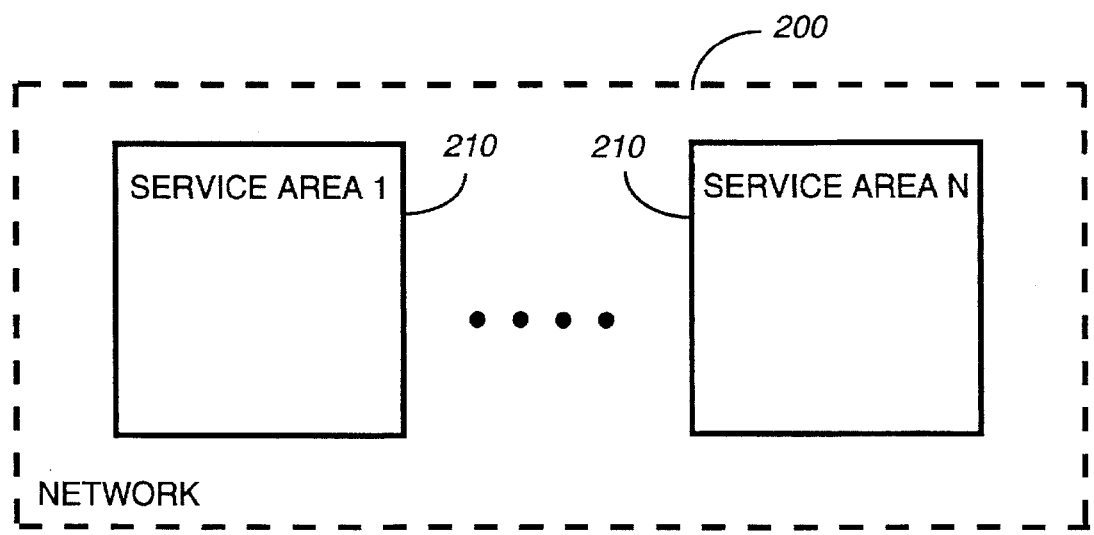
FIG. 8 illustrates a network and service area divisions according to the present invention.

Turning now to FIG. 8, in the case where a receiver desires coverage over a larger region, or to receive messages on multiple frequencies, which would otherwise be defined by multiple SSID's, a single piece of identification information is used, rather than multiple NID's. This is called network roaming information (NRI). A "Network" 200 is defined as a collection of many Service Areas 210 and a Service Area 210 is a coverage area which would otherwise be defined by a plurality of SSID's. An NRI consists of a network identification (NID), a Service Area (SA) Traffic Splitting Flags, and a 3-bit NID multiplier to expand the number of unique Networks.

A Network may be formed by an agreement between several otherwise separate service providers, or may be a single large service provider. In a Network, there is a plurality of Service Areas, and in the example described herein, there are 32 possible Service Areas within a Network, identified by a 5 bit pattern, but a Network may be defined to consist of many more or less Service Areas.

Figure 9:
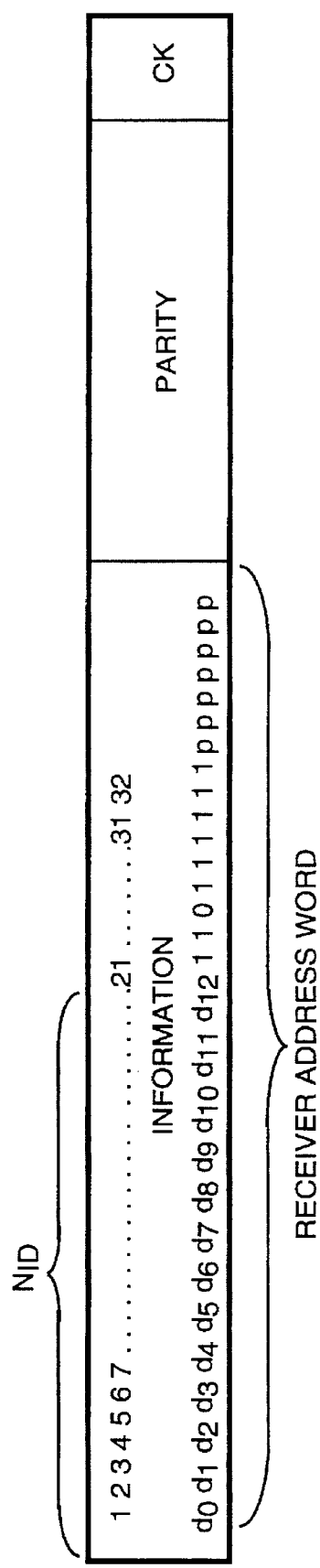
FIGS. 9 and 10 illustrate structures of an address word and a vector word, respectively, in which network roaming identification (NRI) information is coded in accordance with the present invention.
Figure 10:
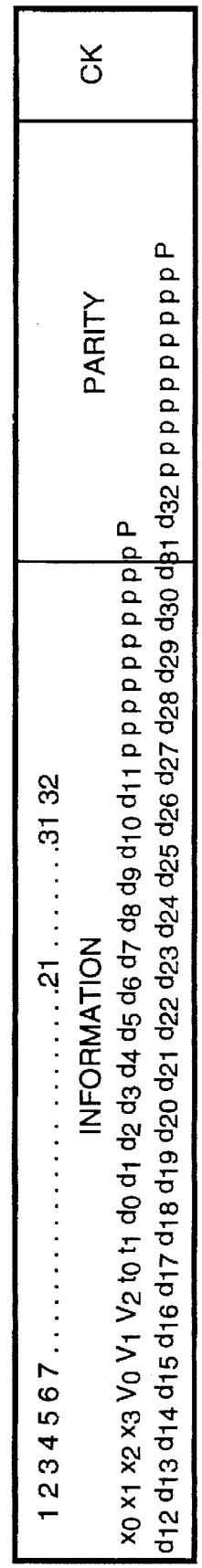

FIGS. 9 and 10 illustrate the manner in which the NRI is encoded in the signal transmitted in each Service Zone. FIG. 10 illustrates a conventional 32–21 binary coded hexadecimal (BCH) address word, which is well known in the art. The first, 21 bits, d0–d20 of this word are used to define an NID, 12 bits of which are used to uniquely identify 4096 networks, as an example.

FIG. 10 illustrates the vector word structure associated with the address word of FIG. 9. The table below gives the bit definitions associated with the vector word of FIG. 10.

ment structure of FIG. 13 provides for a way to predict where the NRI information can be found. In any event, when a match cannot be found from the stored scan list, then the receiver searches its entire synthesizer bandwidth. Once the receiver locks onto frame 0 on a particular frequency, a candidate frequency is qualified or disqualified quickly.

FIG. 11 illustrates the placement structure of the SSID information in a four phase (time division multiplexed) expansion of the frame structure shown in FIG. 1. When a single phase system is used, then all of information in phases A, B, C and D collapse into the phase A. When a two phase system is used, then phases A and B collapse together to form one phase and phases C and D collapse together to form another phase.

As is well known in the art, a time division multiplexed system with multiple phases A, B, C and D provides certain traffic handling advantages for a service provider. A receiver capable of decoding information from only a single phase is assigned to a particular phase by the service provider at the time service is initiated. Some receivers are capable of decoding information from one phase at a time, but can switch to a different phase. In this case, a service provider can initially assign a receiver to a particular phase, but can use the system messages described above to inform the receiver from time to time that messages will be transmitted on a different phase. Finally, some receivers are capable of decoding multiple phases and can therefore, as shown by FIG. 11, lock onto an assigned frame quicker than a single phase receiver.

In order to provide roaming service, all channels (frequencies) in a system which are roaming-capable are required to transmit fully a predetermined number of frames. For example, it is required that all roaming channels transmit

| $t_1$ | $t_0$ | $d_{11}d_{10}d_9d_8d_7d_6d_5d_4d_3d_2d_1d_0$ | |
|---|---|---|---|
| 0 | 0 | $c_3c_2c_1c_0b_3b_2b_1b_0a_3a_2a_1a_0$ | -3 Numeric Characters with Short Addres or 8 Numeric Characters with Long Add. |
| | | a11a10a9 ... a0 | or 12 bits usable for Roaming Networks |
| 0 | 1 | $s_8s_7s_6s_5s_4s_3s_2s_1s_0S_2S_1S_0$- | 8 Sources plus 9 or 30 Unused Bits |
| 1 | 0 | $s_1s_0R_0N_5N_4N_3N_2N_1N_0S_2S_1S_0$ | 8 Sources, 0–63 Message Number, Message Retrieval Flag, and 2 or 23 Unused bits |
| 1 | 1 | | Spare Message Type |

Bits V0V1V2 are used to specify the vector type, such as numeric, tone-only, etc. When the V0V1V2 are set to a value corresponding to a particular type, such as short message/tone only, this signifies that the 12 bits d0–d11 specify a Service Area, Traffic Splitting Flags and Network multiplier. For example, a0–a4 define the Service Area (32 possible) a5–a8 are the Traffic Splitting Flags and a9–a11 are Network multiplier bits. The Network multiplier bits allow for 8 times 4096 more unique NID's.

In certain circumstances when the network address has a system message attached thereto, the 12 bits defining the additional NRI information reside in the message field and the vector would otherwise operates as a vector pointing to the system message in the message field, where the 12 previously described bits also reside.

In each Service Area, the transmitted signal includes the NRI associated with that Service Area. The placement structure of the various parts of the NRI in the signaling protocol is shown in FIGS. 12 and 13. In a receiver which is roaming in a Network, a frequency scan list is stored which includes a list of frequencies for which there is a high probability that an NRI match will be obtained. The placeframes 0 through frame 15 with frame 0 aligned to the four minute time mark. It is established, in this example, that frames 0–15 must be present and that these frames contain the LID words LID1 and LID2 in the frames and phases as shown in FIG. 11.

Across the phases, LID1 and LID2 are offset by one frame so that a receiver assigned to a specific phase is able to determine its desired SSID presence in the least amount of search time on each channel, and to balance or distribute information overhead among the phases.

The placement structure shown in FIG. 11 provides a known time position to allow for quick processing of candidate frequencies when a receiver is roaming. If the roaming decision can be made on the basis of LID's only, then 16 channels can be processed every four minutes. Since frames 0–15 must be present, a fast scan over a large bandwidth is made possible using symbol rate detection to identify roaming capable channels. LID2 is transmitted only in each phase once per cycle and LID1 is transmitted every four frames, once in each phase (in at least frames 0–15).

On all frequencies (channels) which are roaming capable, only frames 16–127 may be shared with other service providers or replaced with an alternate protocol. When a frame is transmitted, it must contain a predetermined SSID pattern, such as, for example, the LID following the pattern established in frames 0–15.

"T" refers to the optional presence of three block information words sent out in frame 0 on a rotating basis to indicate time and calendar information, as described above. The "T" type block information words are sent out in all 4, 2 or 1 phases depending on the system operating speed. It takes 3 cycles to completely refresh a receiver with a complete set of time and calendar information (5 updates each hour). The time/calendar instructions are optional but when carried by the system, are required to follow the rotating pattern of one selection in every cycle. This format provides a known time/calendar position to permit a receiver to quickly process the candidate frequencies when roaming. The rotational sequence is changeable so that a "T" block information word format 101 is used to send a roaming system message when needed.

FIG. 12 illustrates a first placement configuration for NRI information, identified N1–N10. Like the LID's, the SSID information, NRI information is required to appear once during frames 0–15. Thereafter, the pattern optionally continues in those additional frames available. When a service provider chooses to continue the NRI placement sequence past frame 15, the sequence must include all NRI's active on the channel. The pattern shifts positions across phases and frames every four minutes (1 cycle) allowing a single phase pager which is synchronously decoding a channel to eventually see the NRI in its assigned frame. The detection of an NRI twice indicates that all NRI's have been examined.

The placement of 10 NRI's N1–N10 are shown in FIG. 12 as an example. The NRI's are placed sequentially through the phases in an offset fashion, similar to the SSID placement structure of FIG. 11. When a single phase is transmitted, then all of the information collapses into a single phase such that a different NRI appears in each of frame 0 through frame 9. This structure is precessed such that the sequence is offset by at least one frame in the next cycle to avoiding shadowing problems.

Turning to FIG. 13, a second placement sequence for NRI information will be described. In this sequence, all NRI's supported on a channel are required to appear at least once during frames 0–15. However, according to this configuration, an expected or predicted position for an NRI is determined by the following set of rules:

(a) Each frequency or channel is represented by a number in the range of 0–15. M=Modulo16 of Integer [Freq kHz/Channel Spacing kHz]

(b) N=Modulo16 of NID (4 least significant bits);

(c) C=cycle number (0–15); and (d) Expected frame=F=Modulo16 of N+M+C.

According these rules, it is possible to search 16 consecutive frequencies for the same NRI in the 30 second (16 frame) period at the beginning of each 4 minute period of time. It also causes the NRI to shift one frame each cycle which alleviates possible "shadow" problems in the case of a receiver located where two systems have overlap. This placement sequence has a lower NRI "overhead" for cases where the channel carries less than 16 NRI's.

Figure 14:
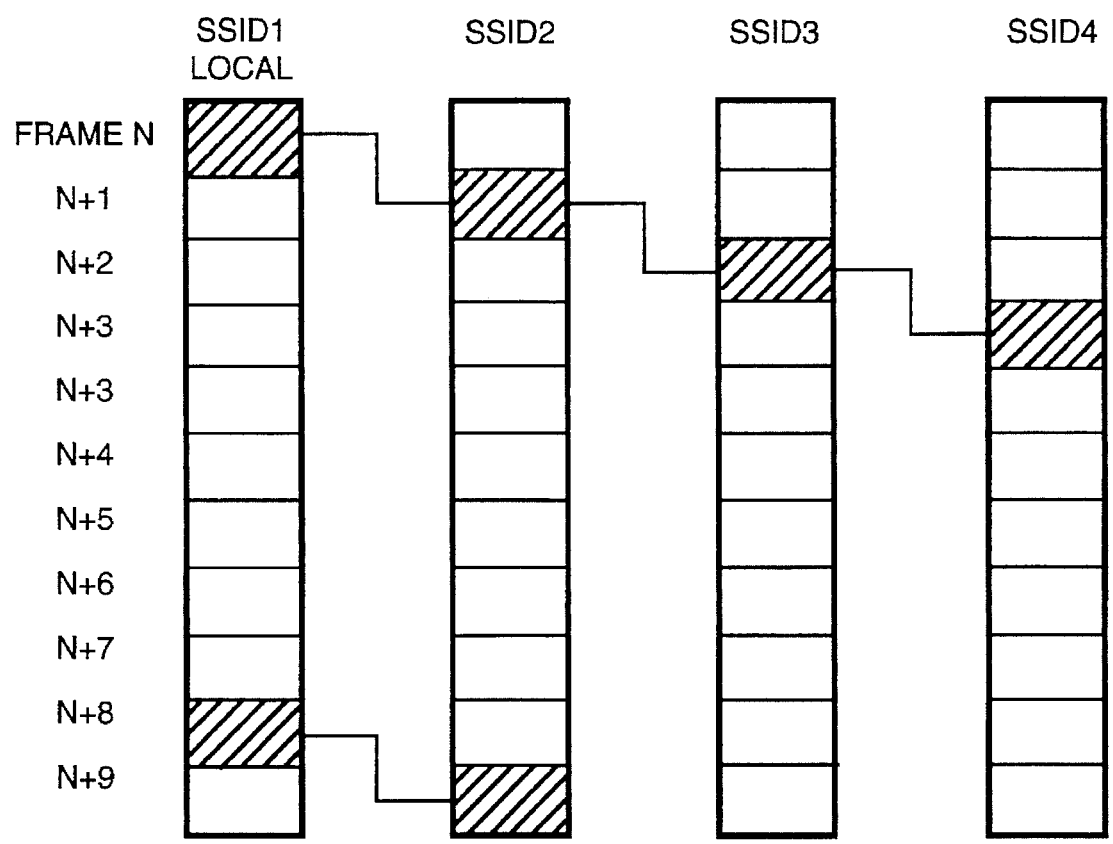
FIG. 14 is a diagram illustrating a scan sequence used by a receiver for channel identification during possible frequency overlap situations.

FIG. 14 illustrates a frame offset mechanism which enables a receiver to scan frequencies in every frame which are offset from its home frame as indicated. This frame offset method is useful in situations where a receiver is straddling an area where there is two or more possible matching frequencies in the same coverage area. In order that a match on any of the possible frequencies can be achieved, for each frequency of which coverage is desired, a frame is chosen in which the receiver can match SSID or NRI information, which is different from the frames for the other frequencies. For example, as shown in FIG. 14, the frame chosen in each frequency is offset by one frame. Other frames could also be chosen. Consequently, the receiver is able to detect for all SSID's since each is assigned to a different frame in the cycle.

Figure 15:
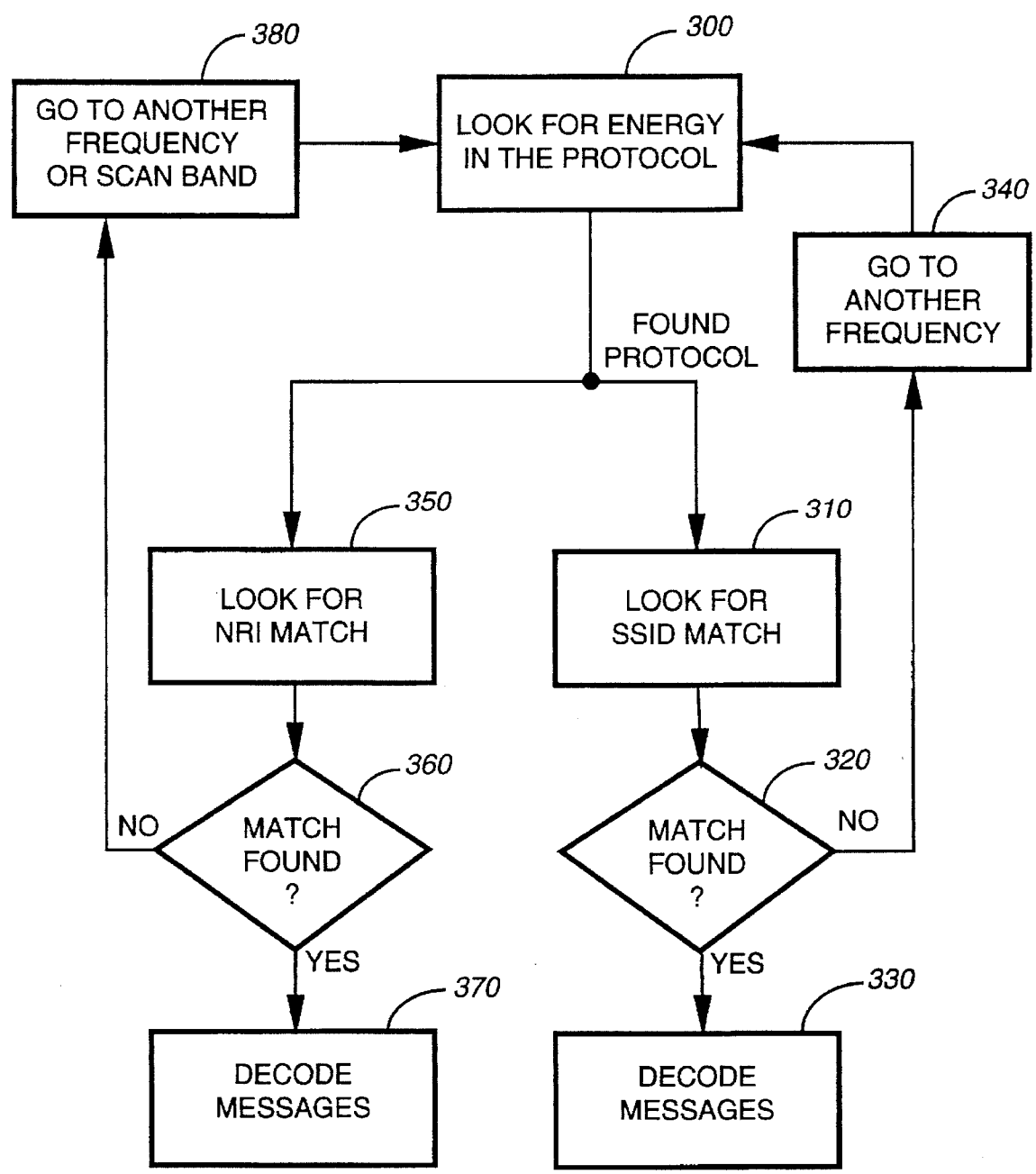
FIG. 15 is a flow chart generally illustrating how a receiver detects SSID and NRI information.

Turning now to FIG. 15, a procedure by which a roaming receiver decodes a message will be described. From the outset, it should be understood that there are a variety of receivers capable of roaming in accordance with the present invention, including single frequency receivers and frequency synthesized receivers which can lock to any frequency in a predetermined bandwidth. Also, both of these receivers may be fixed phase, variable phase or multiple phase receivers.

Regardless of receiver type, when entering a new area in which a receiver has yet to lock onto a signal transmitted in accordance with an established protocol, it is likely that from the last message receiving session the receiver has an approximation of the occurrence of frame 0 at some frequency. The accuracy of this approximation is dependent on the crystal oscillator in the receiver.

In step 300, the receiver attempts to detect energy in the protocol on the last frequency on which it operated. When the receiver has an SSID subscription, the procedure follows on the right side of the flow chart. When the receiver has an Network coverage subscription, the procedure goes to the left side of the flow chart.

In step 310, once frame 0 of a cycle is found, the receiver can detect and compare the SSID information encoded in the transmitted signal with its stored SSID information. This process is performed according to the placement rules described in conjunction with FIG. 11. When a match is found as indicated in step 320, the receiver can locate its assigned frame to decode the message(s) addressed to it in step 330.

However, if the SSID in the transmitted signal does not match with the SSID stored in the receiver (accounting for the current frequency of the receiver), then in step 340, the receiver switches to another frequency, if it is capable of doing so. When the receiver is a single frequency receiver, then it cannot tune to another frequency and will enter a time-out mode and/or a message is optionally displayed on a display of the receiver indicating its inability to receive messages in that current location of the receiver.

When the receiver has only NRI information stored in it, then from step 300, the procedure goes to step 350 and looks for an NRI match, taking into account the NRI placement rules of FIG. 12 or FIG. 13. When a match is found as indicated in step 360, the receiver locates its assigned frame and decodes its addressed messages in step 370.

However, in the event that a match is not found in step 360, in step 380 the receiver tunes to another frequency by referring to a recent list of frequencies where matches have been previously found. When no such list exists in the receiver, then the receiver begins scanning across its band to look for energy in the protocol and the process repeats from step 300.

When a single frequency receiver subscribes to Network coverage, then if a match is not found in step 350, a message is optionally displayed on the receiver that the user has gone outside a subscription area, the receiver is not functioning properly, or the service provider is not transmitting information on that frequency. A time out period is initiated and the process repeated some period of time later in an attempt to find an NRI match.

Below an example of a scan list is shown. Generally, the first entry in the list is the last frequency and associated SSID or NRI that the receiver locked to. Next, the SSID's are listed, and finally, the NRI's are listed with an associated frequency. Thus, a receiver attempts to lock to the last frequency and associated SSID or NRI on which it received messages, and then proceeds through the SSID information, and finally the NRI information.

| FREQUENCY | SSID | NRI |
|---|---|---|
| Frequency 1 | — | NID1 |
| Frequency 2 | SSID2 | |
| Frequency 5 | SSID3 | NID1 |
| Frequency 3 | — | NID1 |
| Frequency 4 | — | NID1 |
| Frequency N | SSIDN | NID1 |

Figure 16:
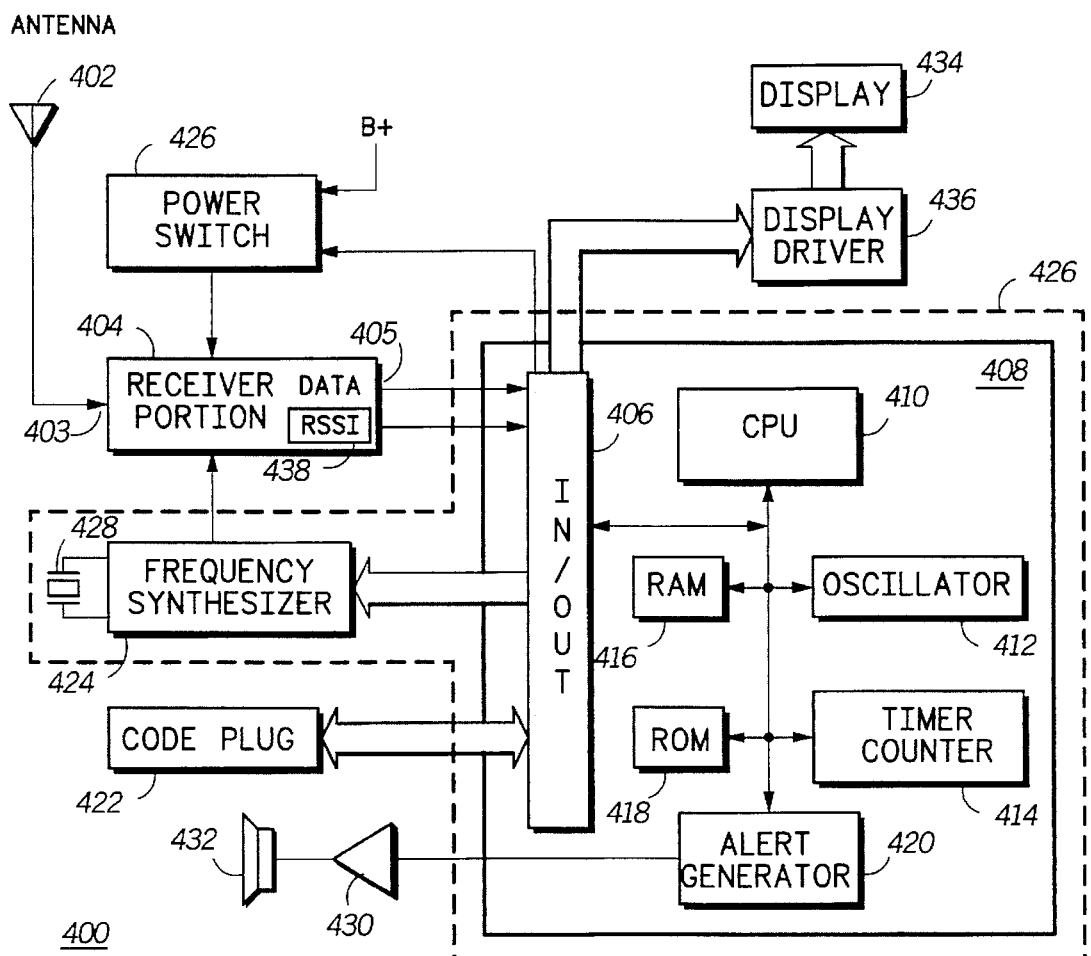
FIG. 16 is an electrical block diagram of a selective call receiver in accordance with the present invention.

FIG. 16 shows an exemplary electrical block diagram of a receiver 400, and particularly a selective call receiver, according to the present invention. Coded message signals transmitted are received by an antenna 402 which couples to the input 403 of the receiver portion 404. The receiver portion 404 preferably is an FM receiver. The received coded message signals are processed by receiver portion 404 in a manner well known in the art, and provided at the output 405 as a stream of binary information. The output 405 couples to the input/output (I/O) port 406 of the microcomputer 408. Receiver portion 404 optionally includes received signal strength indicating (RSSI) means 438 which also connects to the I/O port 406 of the microcomputer 408.

Microcomputer 408, which is embodied, for example, by a Motorola MC68HC05 series microcomputer, performs a variety of functions, including decoding the binary information. Microcomputer 408 includes a CPU 410, oscillator 412, timer counter 414, random access memory (RAM) 416, read only memory (ROM) 418 and alert tone generator 420. CPU 410 controls the operation of receiver 400 and processes the received coded message signals. Oscillator 412 provides the clock for the operation of the CPU 410, and provides the reference clock for timer counter 414. The oscillator 414 is controlled by a crystal, not shown in the diagram. Assigned transmission slot and channel identification information and pager addresses are stored in code plug 422, which is a programmable read only memory, such as an electrically erasable programmable read only memory (EPROM). In addition, the SSID information and NRI information is also stored in the code plug 422. The RAM 416 is used to store code plug information when the receiver 400 is initially turned on, and to store messages as they are received. ROM 418 contains the firmware which controls the microcomputer operation. The firmware includes such programs as for controlling the decoding of transmission slot identify information, channel identification information, receiver address, receiver scanning frequency lists, NRI information, SSID information, and other receiver functions. Alert generator 420 generates an audible alert signal upon reception of a message.

When the receiver 400 is initially turned on, microcomputer 408 functions as a synchronization means, enabling the receiver 400 to synchronize the assigned transmission slot, after the receiver detects information in frame 0 and synchronizes to the transmitted signal. Microcomputer 408 also functions as the decoder for decoding channel identification information, LID information, NID information and pager address information. Microcomputer 408, in conjunction with frequency synthesizer 424, functions as a channel selecting means 426 used to control the scanning of the receiver 400. Microcomputer 408, in conjunction with power switch 428, provides a battery saving function for the receiver 400.

Figure 17:
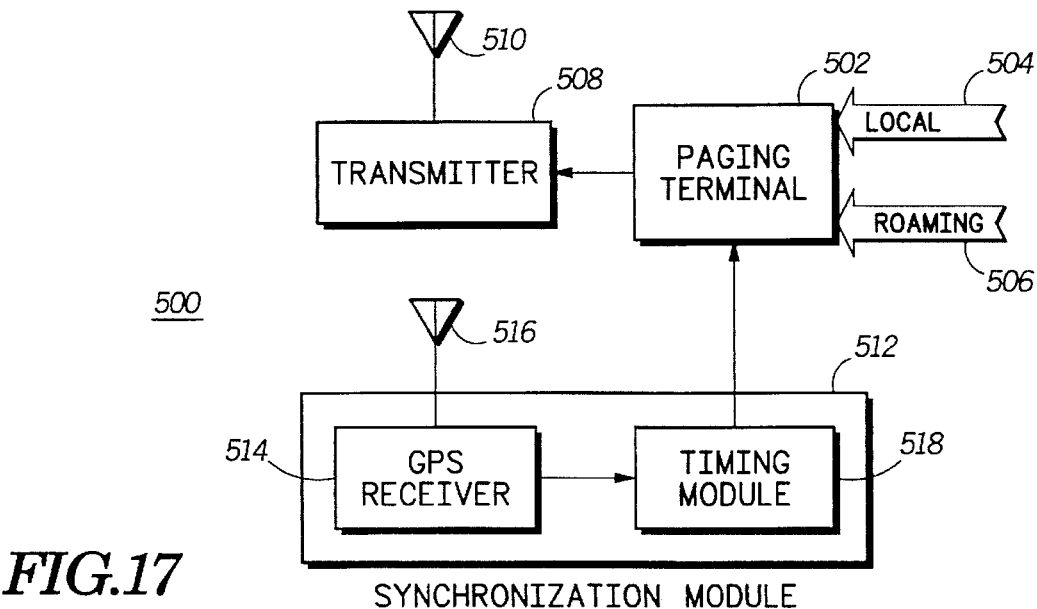
FIG. 17 is an electrical block diagram of a transmitter station in a paging system according to the present invention.

FIG. 17 illustrates an example of a transmitter station 500 useful in accordance with the present invention. Transmitter station 500 comprises a paging terminal 502 used to enter messages originated in a home or local area with respect to a receiver, as indicated at 504, or the messages are for receiver that is roaming outside its local area, as indicated at 506. Messages for a roaming receiver which are originated outside of the coverage area home or local area of a receiver are conveyed to the paging terminal 502 by a hardwire interconnect with a paging terminal in the home or local area, such as a dial-up or hardwired phone line, or by means of an RF signal, such as a satellite receiver.

Messages entered into paging terminal 502 are processed for transmission into the signaling format or protocol described above, and in the aforementioned patent, or another suitable signaling protocol. The messages are placed in queues corresponding to the frame to which a receiver is assigned. The output of the paging terminal is coupled to an RF transmitter 508 for transmission via an antenna 510. It is appreciated that the paging terminal 502 optionally controls more than one transmitter, as in a wide area simulcast system, and synchronization of multiple transmitters in a simulcast system is provided. Various methods for synchronizing the transmitters are available, such as described in U.S. Pat. No. 4,718,109 to Breeden et al.

Furthermore, in order to provide for global synchronization of transmitters to frame 0 as described above, a synchronization module 512 is coupled to the paging terminal 502. The synchronization module comprises a global position system (GPS) receiver 514 and a timing module 516, which together enable the paging terminal 502 to determine an accurate occurrence of frame 0. Instead of a GPS receiver 514, another time standard signal is monitored by suitable monitoring devices.

It should be understood that although the invention has been described in connection with a particular signaling protocol, the invention is useful in connection with any synchronous signaling protocol.

The above description is intended by way of example only and is not intended to limit the present invention in any way except as set forth in the following claims.

What is claimed is:

1. A method for communicating messages to a plurality of addressable receivers in a multiplicity of coverage areas, each coverage area accommodating the transmission of messages to at least one addressable receiver, the method comprising steps of:

dividing each coverage area into a plurality of zones;

storing in each receiver at least one set of coverage identification information, a set of coverage area identification information comprising digital words representing a coverage area identifier for identifying at least one coverage area, at least one zone identifier for identifying at least one zone within a corresponding coverage area, and a frequency identifier for identifying a frequency on which the receiver receives message information in a corresponding coverage area, such that coverage area identifiers for different coverage areas may share the same;

encoding a signal for transmission in each zone, the signal including a coverage area identifier associated with the coverage area, a zone identifier corresponding to a zone within the coverage area, and a message for at least one receiver in the zone;

transmitting the signal in each zone of each coverage area on at least one transmission frequency; and in a receiver, receiving the signal transmitted in a coverage area where the receiver is located if the transmission frequency of the signal corresponds to the frequency identifier stored in the receiver, decoding the signal to recover the coverage area identifier and zone identifier in the transmitted signal to determine whether the coverage area identifier and zone identifier stored in the receiver match the coverage area identifier and zone identifier in the transmitted signal, and further decoding the transmitted signal to recover a message addressed for the receiver if a match is determined.

2. The method of claim 1, wherein the step of encoding further comprises:

generating a plurality of frames for consecutive transmission such that the plurality of frames define a cycle, each frame comprising substantially in sequence, synchronization information, a block information field comprising a plurality of block information words, an address field comprising a plurality of address information, a vector field comprising a plurality of vector information, and a message field comprising a plurality of messages associated with address information and corresponding vector information;

encoding into one block information word a coverage area identifier and a zone identifier associated with the coverage area and zone in which the signal is to be transmitted; and encoding into another of the block information words traffic splitting flags and a country code, the coverage area identifier, zone identifier, traffic splitting flags and country code collectively making up the coverage area identification information in the transmitted signal.

3. The method of claim 2, wherein said one of the plurality of frames is a first of the plurality of frames.

4. The method of claim 2, wherein said step of encoding comprises time division multiplexing first and second signals, wherein for the first signal, the coverage area identifier and zone identifier are encoded in first and second frames, and for the second signal, the coverage area identifier and zone identifier are encoded in third and fourth frames.

5. The method of claim 2, wherein said step of encoding comprises time division multiplexing first, second, third and fourth signals, wherein for the first signal, the coverage area identifier and zone identifier are encoded in the first frame, for the second signal the coverage area identifier and zone identifier are encoded in the second frame, for the third signal the coverage area identifier and zone identifier are encoded in the third frame, and for the fourth signal the coverage area identifier and zone identifier are encoded in the fourth frame.

6. A method for communicating messages to a plurality of addressable receivers in a multiplicity of coverage areas, each coverage area accommodating the transmission of messages to at least one addressable receiver, the method comprising steps of:

dividing each coverage area into a plurality of zones;

assigning to each coverage area a coverage area identifier and a zone identifier for each zone within a coverage area;

encoding a signal for transmission in each zone, the signal including digital words representing a coverage area identifier associated with the coverage area, a zone identifier corresponding to a zone within the coverage area, and a message for at least one receiver in the zone, the step of encoding further comprising steps of:

generating a plurality of frames for consecutive transmission such that the plurality of frames define a cycle, each frame comprising substantially in sequence, synchronization information, a block information field comprising a plurality of block information words, an address field comprising a plurality of address information, a vector field comprising a plurality of vector information, and a message field comprising a plurality of messages associated with address information and corresponding vector information;

encoding into one block information word a coverage area identifier and a zone identifier associated with the coverage area and zone in which the signal is to be transmitted; and encoding into another of the block information words traffic splitting flags and a country code, the coverage area identifier, zone identifier, traffic splitting flags and country code collectively making up the coverage area identification information in the transmitted signal; and transmitting the signal in each zone of each coverage area.

7. The method of claim 6, wherein said one of the plurality of frames is a first of the plurality of frames.

8. The method of claim 6, wherein said step of encoding comprises time division multiplexing first and second signals, wherein for the first signal, the coverage area identifier and zone identifier are encoded in first and second frames, and for the second signal, the coverage area identifier and zone identifier are encoded in third and fourth frames.

9. The method of claim 6, wherein said step of encoding comprises time division multiplexing first, second, third and fourth signals, wherein for the first signal, the coverage area identifier and zone identifier are encoded in the first frame, for the second signal the coverage area identifier and zone identifier are encoded in the second frame, for the third signal the coverage area identifier and zone identifier are encoded in the third frame, and for the fourth signal the coverage area identifier and zone identifier are encoded in the fourth frame.

10. A communication receiver comprising:

a receiver circuit for receiving a transmitted signal and generating an output signal, the transmitted signal comprising a plurality of frames for consecutively transmitted such that the plurality of frames define a cycle, each frame comprising substantially in sequence, synchronization information, a block information field comprising a plurality of block information words, an address field comprising a plurality of address information, a vector field comprising a plurality of vector information, and a message field comprising a plurality of messages associated with address information and corresponding vector information, a coverage area identifier and zone identifier associated with the coverage area and zone in which the signal is to be transmitted being encoded in one of the plurality of block information words in one of the plurality of frames;

a control circuit coupled to the receiver circuit and responsive to the output signals of receiver, the control circuit comprising:

a memory for storing at least one set of coverage area identification information, a set of coverage area identification information comprising digital words representing a coverage area identifier for identifying at least one coverage area, at least one zone identifier for identifying at least one zone within a corresponding coverage area, a frequency identifier for identifying a frequency on which the receiver receives message information in a corresponding coverage area, and an address associated with the communication receiver; and a processor circuit for decoding the output signals from the receiver circuit in accordance with a control program, the processor circuit being programmed by the control program for decoding the output signal of the receiver circuit to recover the coverage area identifier and zone identifier in the transmitted signal from the first block information word and decoding another block information word to recover traffic splitting flags and a country code in order to determine whether the coverage area identification information stored in the communication receiver match the coverage area identification information in the transmitted signal, and further decoding the output signal of the receiver circuit to recover a message addressed for the receiver if a match is determined.

11. The communication receiver of claim 10, and further comprising a frequency synthesizer circuit coupled to the receiver circuit for changing a tuning frequency of the receiver circuit, wherein the processor is further programmed by the control program to respond to traffic splitting flags in the transmitted signal to cause the frequency synthesizer to change the tuning frequency of the receiver circuit so that the selective call receiver receives messages carried by a transmited signal on a different transmission frequency.

* * * * *